Patented Oct. 12, 1943

2,331,859

UNITED STATES PATENT OFFICE 2,331,859

METHOD OF MAKING SOLUTIONS OF ALUMINUM CELLULOSE GLYCOLLATE

Martin J. Roberts, Midland, Mich., assignor to The Dow Chemical Company, Midland, Mich., a corporation of Michigan No Drawing. Application March 6, 1941, Serial No. 382,103

5 Claims. (Cl. 260—232)

This invention relates to a method for the preparation of aqueous solutions of aluminum cellulose glycollate. It relates in particular to the preparation of such solutions which are more viscous than solutions of similar concentration of the sodium or ammonium salts of the same cellulose glycollic acid. The solutions with which the invention is concerned are acid in nature and of such viscosity as to be useful for sizing, as thickeners, and the like.

It is known that the aluminum salt of cellulose glycollic acid can be precipitated from aqueous solutions of an alkali metal salt or an ammonium salt of cellulose glycollic acid by adding an excess of a water-soluble aluminum compound such as, for example, aluminum chloride, aluminum sulfate, or aluminum acetate. Such procedure has been long known to produce a granular precipitate of aluminum cellulose glycollate which is insoluble in water and in most acids. In order to obtain solutions from precipitated aluminum cellulose glycollate made in the customary manner it has been considered necessary to separate it from the supernatant liquor from which it has been precipitated, and subsequently to dissolve it in an alkaline medium such, for example, as a dilute solution of sodium hydroxide or of ammonium hydroxide. In a co-filed application of the present inventor and R. D. Freeman, Serial No. 382,102, there is described a method of making clear, uniform acid solutions of aluminum cellulose glycollate of about the same viscosity as are solutions of like concentration of sodium cellulose glycollate.

Because of the inherent insolubility of aluminum cellulose glycollate in water and its high molecular weight as compared with most cellulose derivatives, this compound is of considerable potential value as a sizing material or thickening agent. It would be of decided advantage to form solutions of aluminum cellulose glycollate of higher viscosity than its heretofore known alkaline solutions.

It is, accordingly, an object of the invention to provide useful solutions of aluminum cellulose glycollate in an acid medium and of a viscosity suitable for use in coating, sizing, or thickening operations at the concentrations ordinarily employed for such purposes. Another object is to provide such solutions of viscosity considerably higher than those of like concentration of the sodium or ammonium salts of the same cellulose glycollic acid. Yet another object is to provide a method whereby clear acid solutions of aluminum cellulose glycollate may be prepared without first precipitating and isolating the water-insoluble aluminum salt. Other objects and advantages will appear hereinafter.

It has now been found that the foregoing and related objects may be attained by preparing aluminum cellulose glycollate from an aqueous solution of an alkali metal salt or an ammonium salt of cellulose glycollic acid under certain controlled conditions of hydrogen ion concentration. Specifically, the invention rests on the discovery that the desired type of viscous solution of aluminum cellulose glycollate is obtained when there is added, preferably with stirring, to an aqueous solution of a water-soluble alkali metal or ammonium salt of cellulose glycollic acid an aqueous solution of a water-soluble salt of aluminum in an amount at least equivalent to the amount of alkali metal ions or ammonium ions present, and under conditions such that the resulting mixture has a pH less than 7 but greater than 4.5. When the water-soluble aluminum salt employed as a reagent is added in an amount or at a concentration such as to produce in the reaction mixture a pH less than 4.5 aluminum cellulose glycollate precipitates in the manner described in the prior art. When, however, the conditions are so controlled that the final solution is in the pH range above 4.5 but below 7 the product obtained is a clear solution of aluminum cellulose glycollate, which solution has considerably higher viscosity than the alkaline solution of the sodium or ammonium cellulose glycollate from which that aluminum compound has been prepared. Similarly, the solutions of the present invention are of considerably greater viscosity than are the acid solutions of aluminum cellulose glycollate prepared according to the method of the aforesaid concurrently filed application. It has been found that when aluminum cellulose glycollate solutions are prepared as above described in a pH range between 4.5 and 7, such solutions may subsequently be acidified further to reduce the pH to any desired value below 4.5 without precipitation of the aluminum cellulose glycollate, and without material effect upon the viscosity of the solution. It has been found as well, that the new viscous solutions of aluminum cellulose glycollate may, if desired, be made alkaline by the addition of sodium or ammonium hydroxide without materially affecting the viscosity of the solution. The new method, then provides a means for increasing materially the viscosity of a solution of given concentration of cellulose glycollic acid which can subsequently be employed at the new elevated viscosity level at any desired hydrogen ion concentration.

When the new viscous solutions of aluminum cellulose glycollate are first prepared they will, of course, contain as incidental solutes an alkali metal salt or an ammonium salt corresponding to the aluminum salt employed as reagent. The salts formed through combination of the cation of the cellulose glycollic acid salt initially employed with the anion of the aluminum salt used as a reagent may be removed from the viscous aluminum cellulose glycollate solutions by dialysis without apparent effect upon the stability or viscosity of the new solutions.

Solutions of aluminum cellulose glycollate of the type here concerned may be prepared directly from the etherification reaction mixture whereby cellulose glycollic acid is produced from alkali cellulose and chloroacetic acid. Such reaction mixtures contain, in addition to sodium cellulose glycollate, an amount of sodium chloride as well as certain organic by-products. When these reaction mixtures are treated according to the present invention with a water-soluble aluminum salt to produce a thickened solution with a pH value between 7 and 4.5 the so-formed solutions will also contain the excess sodium chloride and organic by-products produced in the etherification reaction. At least the inorganic components of the so-formed solutions may be removed therefrom by dialysis.

Any water-soluble aluminum salt may be used in preparing the new solutions. If the aluminum salt is one of a weak acid, e. g. aluminum acetate, the quantity which can be added without lowering the pH below 4.5 and hence without precipitation of insoluble aluminum cellulose glycollate may vary over a wide range. If, however, an aluminum salt of a strong acid, such as aluminum chloride or aluminum sulfate, is employed, considerable care must be taken to prevent localization of aluminum salts which may result in the formation of gels or precipitates. To this end it is wise to provide adequate agitation and to employ an initial solution of the water-soluble alkali metal salt of cellulose glycollic acid of sufficiently low viscosity so that agitation is practical throughout the stage in the reaction at which the said water-soluble salt is being converted to the aluminum cellulose glycollate. When the initial cellulose glycollic acid salt employed is a purified or dried and redissolved sodium cellulose glycollate it has been found that greater care must be exercised during the step of converting to the aluminum salt than when a relatively crude cellulose glycollate such as that obtained directly from the etherification reaction is employed.

The following examples illustrate the practice of the invention:

Example 1

A crude solution of sodium cellulose glycollate weighing 500 grams, prepared by the etherification of an alkali cellulose with chloroacetic acid and containing 1.5 per cent by weight of sodium cellulose glycollate, was treated with 20 grams of a 10 per cent aqueous solution of commercial alum $(Al_2(SO_4)_3 \cdot 18H_2O)$. A stable thickened solution was thus obtained which had a pH of 5.2 and could be altered at will as to hydrogen ion concentration by the addition of hydrochloric acid or of sodium hydroxide without precipitation of the dissolved aluminum cellulose glycollate. To prove the presence of aluminum cellulose glycollate in the acid solution a sample thereof was mixed with ethyl alcohol which caused precipitation of a white water-insoluble cellulose ether containing 2.60 per cent combined aluminum. The cellulose glycollic acid from which this aluminum salt had been prepared was found by analysis to be of a degree of substitution of 0.59 glycollic acid groups per anhydro-glucose unit. The theoretical aluminum content for neutral aluminum cellulose glycollate of this degree of substitution is 2.70 per cent while that for a monobasic aluminum salt of the same cellulose glycollic acid is 3.85 per cent. The principal solute in the new thickened solution is thus seen to be neutral aluminum cellulose glycollate.

Example 2

In a manner similar to that described in the preceding example, an alkaline solution of sodium cellulose glycollate having a pH of 10.9 was treated with slightly more than the theoretical amount of an aqueous solution of alum until the solution had a pH of 4.9. Samples taken from this solution could be acidified or made alkaline at will with no apparent change in viscosity and without precipitation of the aluminum cellulose glycollate, but the addition of further amounts of aluminum sulfate solution to a pH value of 4.0 caused precipitation of the insoluble aluminum cellulose glycollate. The main body of the thickened solution was dialyzed until free from chlorides, which had been present as original contaminants, and from sulfates. The dialyzed solution suffered no change in pH, and no visible change in the order of its viscosity. Aluminum cellulose glycollate, precipitated from the dialyzed solution by means of alcohol and analyzed for aluminum, was found to be substantially identical with the theoretical neutral aluminum cellulose glycollate.

Example 3

To a 2 per cent solution of sodium cellulose glycollate in water was added slightly more than the theoretical amount of a 10 per cent solution of aluminum acetate. The resulting solution had a pH of 6.0. During the addition of the aluminum acetate solution a small quantity of a stringy precipitate appeared temporarily but redissolved on stirring. The thickened solution gave no precipitate of aluminum cellulose glycollate when hydrochloric acid was added to a pH of 2.7, while samples of the thickened solution treated with small amounts of aluminum sulfate to yield a pH of 4.2 provided a voluminous precipitate of water-insoluble aluminum cellulose glycollate.

The thickened solutions of the present invention have been employed concurrently as a thickening agent and as protective colloid. Such solutions have also been employed as sizes for paper and for textiles where the water-insoluble characteristics of the sizing as well as the high viscosity of solutions of low concentration are desirable.

The invention has been illustrated primarily with respect to the use of aqueous solutions of sodium cellulose glycollate and with respect to aluminum sulfate and aluminum acetate as reagents. It is to be understood that other water-soluble salts of a cellulose glycollic acid whose sodium salt is soluble in water may be employed as the source of this acid and that other water-soluble salts of aluminum may be employed instead of those in the examples. The invention may also be practiced by dissolving aluminum cellulose glycollate in an alkaline aqueous medium and adding thereto enough of an aqueous solution of an aluminum salt, such as alum, to reduce the pH to the range between 7 and 4.5.

I claim:

1. The method of preparing a stable aqueous solution of aluminum cellulose glycollate having a high viscosity which comprises adding to a non-acidic aqueous solution of a salt of a cellulose glycollic acid whose dry sodium salt is readily soluble in water an aqueous solution of a water-soluble aluminum salt in such proportion as to produce in the mixture a pH value below 7 but above 4.5 while controlling the addition of the said solution so as to maintain the resulting mixture constantly at a pH value above 4.5 and avoiding precipitation of the aluminum cellulose glycollate.

2. The method according to claim 1 in which solutions of sodium cellulose glycollate and of aluminum sulfate, respectively, are employed.

3. The method according to claim 1 in which solutions of sodium cellulose glycollate and of aluminum acetate, respectively, are employed.

4. The method according to claim 1 in which the solution of the product is dialyzed to remove inorganic salts.

5. The method according to claim 1 in which an alkaline solution of aluminum cellulose glycollate is employed.

MARTIN J. ROBERTS.